United States Patent
Arbel et al.

(10) Patent No.: US 8,166,444 B2
(45) Date of Patent: Apr. 24, 2012

(54) CLOCK GATING USING ABSTRACTION REFINEMENT

(75) Inventors: Eli Arbel, Haifa (IL); Cindy Eisner, Haifa (IL); Oleg Rokhlenko, Haifa (IL)

(73) Assignee: International Business Machines Corporations, Armonk, NY (US)

( * ) Notice: Subject to any disclaimer, the term of this patent is extended or adjusted under 35 U.S.C. 154(b) by 350 days.

(21) Appl. No.: 12/489,441

(22) Filed: Jun. 23, 2009

(65) Prior Publication Data

US 2010/0325596 A1 Dec. 23, 2010

(51) Int. Cl.
*G06F 17/50* (2006.01)
*G06F 9/455* (2006.01)

(52) U.S. Cl. ........ 716/134; 716/103; 716/106; 716/107; 716/110; 716/111; 716/113; 716/132

(58) Field of Classification Search ........... 716/103, 716/106–107, 110–111, 113, 132, 134
See application file for complete search history.

(56) References Cited

U.S. PATENT DOCUMENTS

| | | | |
|---|---|---|---|
| 6,567,959 B2 * | 5/2003 | Levin et al. | 716/107 |
| 6,643,829 B1 * | 11/2003 | Borkovic et al. | 716/103 |
| 7,594,200 B2 * | 9/2009 | Eisner et al. | 716/134 |
| 7,849,428 B2 * | 12/2010 | Barowski et al. | 716/106 |
| 2004/0153981 A1 | 8/2004 | Wilcox et al. | |
| 2010/0325596 A1 * | 12/2010 | Arbel et al. | 716/108 |

OTHER PUBLICATIONS

Alexander Smith, Diagnosis of Combinational Logic Circuits Using Boolean Satisfiability, University of Toronto, 2004 Source: http://sr.utias.utoronto.ca/~ads/papers/MAScThesisASmith.pdf.
V. Paruthi et al., "Real Control with Virtual Machine Manager", Formal Methods in Computer Aided Design, 2007 Source: http://www.cc.gatech.edu/~manolios/fmcad06/presentations/FMCAD-2006-Workshop/Paruthi.ppt.
E. Arbel, C. Eisner, A. Itskovich, GateAlert: A Clock Gating Tool, Austin Conference on Energy Efficient Design, 2007.
Aaron P. Hurst: Automatic synthesis of clock gating logic with controlled netlist perturbation. DAC 2008: 654-657.

* cited by examiner

*Primary Examiner* — Nghia Doan
(74) *Attorney, Agent, or Firm* — Ziv Glazberg

(57) ABSTRACT

An initial clock gating function is introduced to an original circuit design. Using abstraction-refinement, the initial clock gating function is modified such that the gated circuit design is equivalent to the original circuit design. A model checker, such as a SAT solver, may be utilized to determine equivalency of two circuit designs. A counter-example may be determined by the model checker to negate equivalency. The counter-example may be utilized to modify the initial clock gating function to determine a modified gated circuit design that is equivalent to the original circuit design.

17 Claims, 5 Drawing Sheets

CLOCK GATING USING ABSTRACTION REFINEMENT

BACKGROUND

The present disclosure relates to low power circuit design, and to designing a low power circuit using clock gating, in particular.

One of the most challenging tasks in chip design is to reduce power consumption in electronic chip designs. Among the many techniques for power reduction, clock gating is one of the most known and widely used. Clock gating reduces the power consumption by partially disabling portions of the circuitry not required for the operation of the circuitry at a given cycle. A flip-flop of a circuitry consumes power when it receives a clock signal, indicating a new cycle, and re-computes its value. Using clock gating technique, the clock signal to the flip-flop is blocked when the recomputed value of the flip-flop is not required in order for the circuitry to behave according to its design. A logic blocking the clock signal is also referred to as clock gating function.

The value of the flip-flop may not be required if its value is not recomputed, and the circuitry still behaves correctly. For example, if the recomputed value is the same as the current value—recomputation may not be required. An additional exemplary scenario in which a recomputed value is not required may be a case in which the recomputed value is later used in a logical operator whose value does not depend on the recomputed value. Such is the case if the recomputed value is later on ANDed with a ZERO value—the truth value of the AND component is zero, independent of the recomputed value.

It will be noted that in the present application, flip-flops refer to any form of state storage devices. Unless explicitly stated otherwise, flip-flops refer also to latches.

BRIEF SUMMARY OF THE INVENTION

One exemplary embodiment of the disclosed subject matter is a computerized system comprising: a circuit design modifier for introducing a clock gating function to an original circuit design; the circuit design modifier determines a gated circuit design; a processor; a circuit comparator for comparing a portion of the original circuit design and a portion of the gated circuit design; the circuit comparator utilizes a model checker; the circuit comparator utilizes the processor; and a clock gating modification module for modifying the gated circuit design in accordance with a result provided by the circuit comparator; the clock gating modification module determining a modified gated circuit design.

Another exemplary embodiment of the disclosed subject matter is a method comprising: modifying an original circuit design into a gated circuit design by introducing a first clock gating function; determining a counter-example negating equivalency between a portion of the original circuit design and a portion of the gated circuit design; the determining a counter-example negating equivalency is performed by a processor; and modifying the gated circuit design in accordance with the counter-example to determine a modified gated circuit design; whereby the original circuit design is transformed to a modified gated circuit design; the modified gated circuit design is characterized in gating a portion of clock signals of the modified gated circuit design.

Yet another exemplary embodiment of the disclosed subject matter is a computer program product comprising: a computer readable medium; first program instructions to modify an original circuit design into a gated circuit design by introducing a first clock gating function; second program instructions to determine a counter-example negating equivalency between a portion of the original circuit design and a portion of the gated circuit design; third program instructions to modify the gated circuit design in accordance with the counter-example to determine a modified gated circuit design; wherein the first, second, and third program instructions are stored on the computer readable media.

Yet another exemplary embodiment of the disclosed subject matter is a computerized system comprising: a basic logic cloud divider for dividing an original circuit design to one or more basic logic clouds; a circuit design modifier for introducing a clock gating function to a basic logic cloud; the clock gating function is applied to a flip-flop of the basic logic cloud; the circuit design modifier determines a gated circuit design; a circuit comparator for comparing a portion of the basic logic cloud and a portion of the gated circuit design; the circuit comparator utilizes a model checker; the model checker is a SAT solver; the SAT solver configured to determine a counter-example to negate equivalency between the portion of the basic logic cloud and the portion of the gated circuit design; a clock gating modification module for modifying the gated circuit design in accordance with a result provided by the circuit comparator; the clock gating modification module determining a modified gated circuit design; and an output module for storing the modified gated circuit design; wherein the circuit design modifier, the circuit comparator and the refinement module are configured to be iteratively operated.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
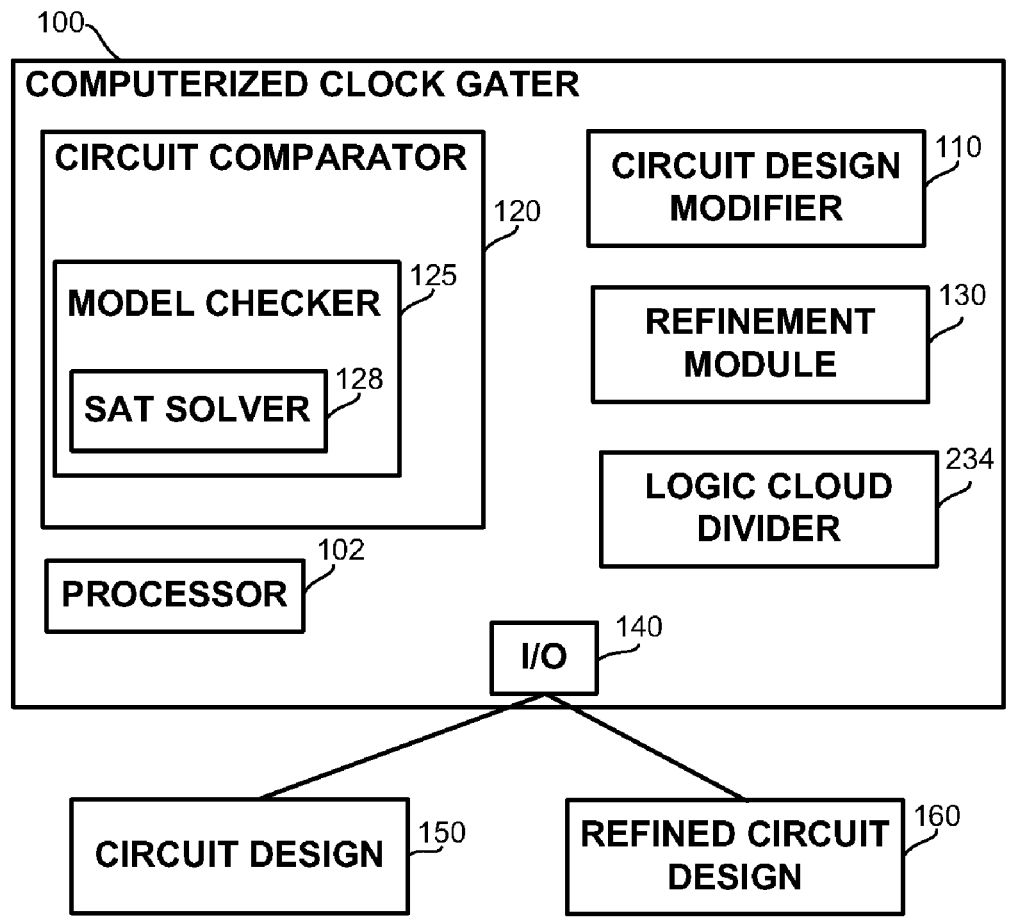
FIG. 1 shows a block diagram of a computerized clock gater in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a device for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to reduce power consumption of a circuit design. Another technical problem dealt with by the disclosed subject matter is to determine a clock gating function that will not affect the correct behavior of the circuit design. A yet another technical problem dealt with by the disclosed subject matter is to determine the clock gating function automatically.

One technical solution is to determine equivalence of a clock gated circuit design and a non-clock gated circuit design using a model checker, such as for example a SAT solver. Another technical solution is to use a counter-example produced by the model checker to modify the clock gated circuit design such that it will be equivalent to the non-clock gated circuit design. Yet another technical solution is to initially use a restricting clock gating function, and modify it using counter-examples provided by the model checker until the modified clock gating function does not affect to correct behavior of the circuit design.

One technical effect of utilizing the disclosed subject matter is generating a counter-example providing a refuting evidence that the clock gated circuit design and the non-clock gated circuit design are not equivalent. Another technical effect of utilizing the disclosed subject matter is generating a clock-gated circuit design or a modified clock-gated circuit design. Yet another technical effect of utilizing the disclosed subject matter is determining a set of scenarios in which a flip-flop's value is not required for the correct behavior of the circuitry.

A computerized environment in accordance with some exemplary embodiments of the subject matter may comprise a computerized clock gater and a circuit design. The computerized clock gater may add a clock gating function to the circuit design to produce a gated circuit design. The gated circuit design is equivalent to the circuit design with respect to a specification of the circuit design.

In some exemplary embodiments of the disclosed subject matter, a combinatorial equivalence of the two circuit designs is examined. Two circuit designs are combinatorial equivalent if the inputs and the outputs of the corresponding state storage devices in each circuit is identical. It will be noted that combinatorial equivalence may be negated by a single-cycle counter-example. In some exemplary circuit designs a first flip-flop has direct influence on a second flip-flop and therefore combinatorial equivalence may be negated by a counter-example comprising more than one cycle. The disclosed subject matter may be applied on a portion of the circuit design not comprising a flip-flop that influences another flip-flop to prevent such scenario.

In other exemplary embodiments of the disclosed subject matter, a sequential equivalence of the two circuit designs is examined. Two circuit designs are said to be sequentially equivalent if they provide identical outputs given the same inputs. It will be noted that in some exemplary embodiments, sequential equivalence may only be negated by a counter-example comprising more than one cycle.

Referring now to FIG. 1 showing a block diagram of a computerized clock gater in accordance with some exemplary embodiments of the disclosed subject matter. A computerized clock gater 100 comprises a circuit design modifier 110, a circuit comparator 120, a refinement module 130, also referred to as a clock gating modification module and an I/O 140.

The I/O 140 may be used to receive a circuit design 150.

The circuit design modifier 110 may modify the circuit design 150 to introduce a clock gating function. In some exemplary embodiments of the disclosed subject matter, the clock gating function is defined over a set of signals that are either inputs of the gated circuit design or outputs of flip-flops in the gated circuit design. In other exemplary embodiments, the clock gating function may be defined over a portion of the aforementioned signals. In an exemplary embodiment, the circuit design modifier 110 adds a clock gating function to a flip-flop. The clock gating function may be a clock gating function that is likely to be more limiting than a clock gating function that does not affect the behavior of the circuit design 150. For example, a clock gating function that always blocks the clock signal to the flip-flop, such as a constant ZERO. In other exemplary embodiments of the disclosed subject matter a different clock gating function may be used, such as a clock gating function defined by a user, a predetermined clock gating function selected from a set of clock gating functions and the like. In some exemplary embodiments, the clock gating function may be applied to a set of one or more flip-flops. In other exemplary embodiments, several clock gating functions may be applied to several flip-flops.

The circuit comparator 120 may be utilized to determine equivalence between a modified circuit design produced by the circuit design modifier 110 and the circuit design 150. As disclosed above, in some exemplary embodiments sequential equivalence and in others combinatorial equivalence may be determined. It will be noted that the disclosed subject matter is not limited to the aforementioned equivalency determinations and other types of equivalences may be determined to detect whether the clock gating function added by the circuit design modifier 110 affected the behavior of the circuit design 150 with respect to a predetermined specification. In some exemplary embodiments, the circuit comparator utilizes a model checker 125 to determine equivalence. The model checker 125 may be a SAT-based model checker, a Binary Decision Diagram (BDD) based model checker, Symbolic Trajectory Evaluation (STE) model checker and the like. For example, the model checker 125 may comprise a SAT solver 128 and utilize it to determine equivalence of the two circuit designs, as will be explained in more detail in regards to FIG. 3. In some exemplary embodiments of the disclosed subject matter, the circuit comparator 120 does not comprise a model checker such as model checker 125 and instead utilizes an interface (not shown), such as an Application Programming Interface (API) to a third-party model checker to perform a portion of the determination required in order to verify or falsify equivalence between two circuit designs.

The refinement module 130 may be utilized to modify the clock gating function in case the circuit comparator 120 determines that the modified circuit design and the circuit design 150 are not equivalent. In some exemplary embodiments, the model checker 125 provides a counter-example to negate equivalency of the two circuit designs. The counter-example may be utilized by the refinement module 130 to modify the clock gating function such that the counter-example does not apply to a refined circuit design.

For example, consider a circuit design 150 comprising a flip-flop named "F". The modified circuit design determined by the circuit design modifier 110 may comprise a constant ZERO clock gating function. The model checker 125 may provide a counter-example negating combinatorial equivalence in which a specific input causes the value of the flip-flop "F" to be ZERO for the circuit design 150. However, due to the clock gating function, the value of the flip-flop "F" in the modified circuit design is ONE for that specific input. In such case, the refinement module 130 may refine the clock gating function to be ONE for the specific input expressed by the counter-example and ZERO for every other input. The refined circuit design may be compared with the circuit design 150 using the circuit comparator 120 to determine equivalency. The computerized clock gater 100 may modify the clock gating function such that the clock signal is passed to the flip-flop "F" for the specific input.

In the present disclosure a refined circuit design is a circuit design comprising a refined clock gating function. A refined clock gating function is a clock gating function that was modified to be toggled for one or more executions represented by a counter-example.

In an exemplary embodiment, the computerized clock gater 100 may iteratively modify the clock gating function until a determination of a refined circuit design that is equivalent to the circuit design 150.

In some exemplary embodiments, the computerized clock gater 100 further comprises a logic cloud divider 134 for dividing the circuit design 150 into one or more basic logic clouds, as is explained below in regards to FIG. 5. The one or more basic logic clouds may be individually modified by the circuit design modifier 110, compared to their corresponding original design by the circuit comparator 120 and modified by the refinement module 130.

In some exemplary embodiments, the I/O 140 may store a refined circuit design 160 that is a gated circuit design equivalent to the circuit design 150.

In some exemplary embodiments, the computerized clock gater 100 further comprises a processor 102. The processor 102 is a Central Processing Unit (CPU), a microprocessor, an electronic circuit, an Integrated Circuit (IC) or the like. The processor 102 may be utilized to perform computations required by the circuit design modifier 110, the refinement module 130, the logic cloud divider 234, the circuit comparator 120, the model checker 125, the SAT solver 128 or the like. In some exemplary embodiments of the disclosed subject matter the circuit comparator 120 comprises the processor 102. In other exemplary embodiments, the circuit comparator 120 utilizes the processor 102 to compare two circuit designs.

Figure 2:
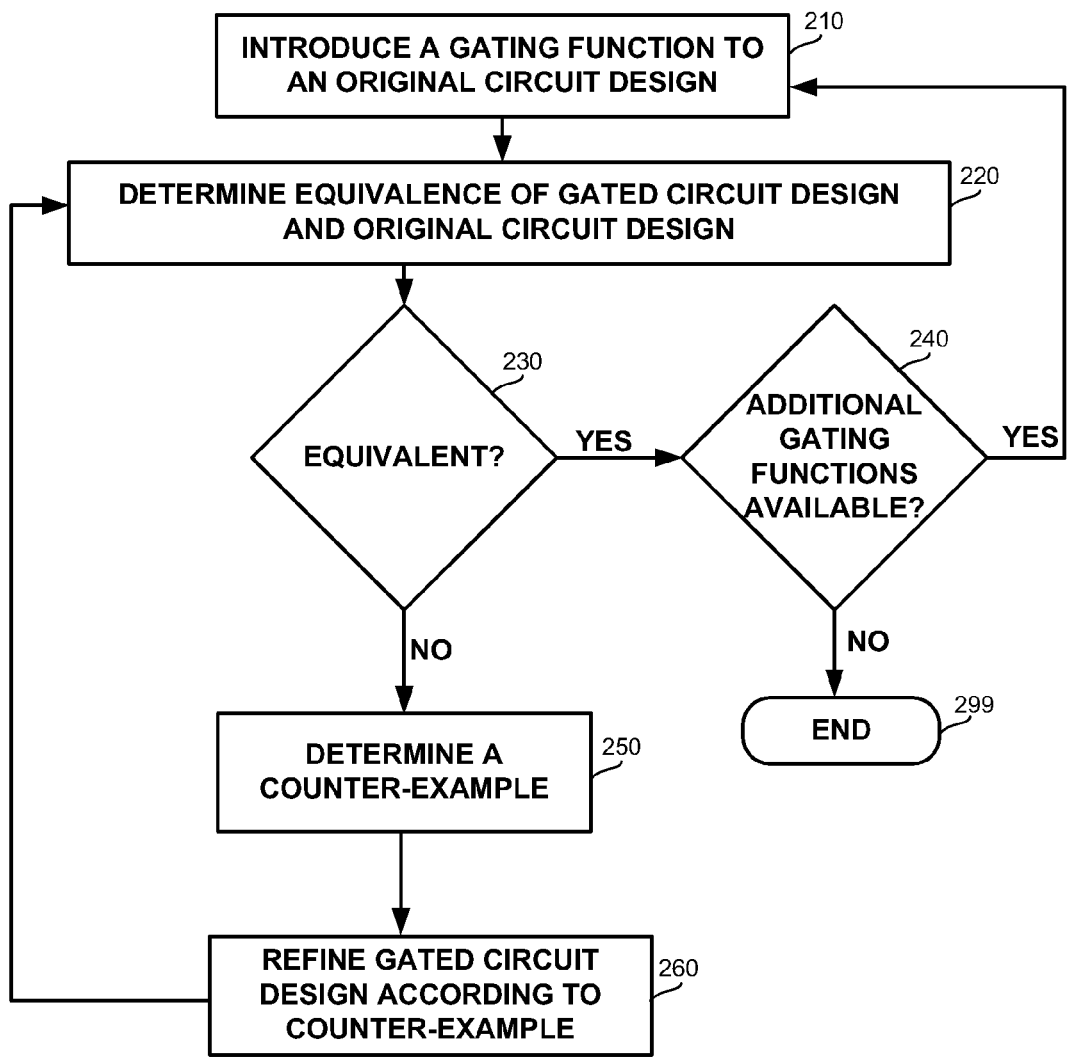
FIG. 2 shows a flowchart diagram of a method in accordance with some exemplary embodiments of the disclosed subject matter.

Referring now to FIG. 2 showing a flowchart diagram of a method in accordance with some exemplary embodiments of the disclosed subject matter. [0036] In step 210 a clock gating function is introduced to an original circuit design, such as 150 of FIG. 1, to determine a gated circuit design.

In step 220, a determination is made if the original circuit design and the gated circuit design are equivalent, such as performed by a circuit comparator, such as 120 of FIG. 1. In some exemplary embodiments combinatorial equivalency is determined. In other exemplary embodiments sequential equivalency is determined.

In step 230 a determination is made based on the equivalency determination of step 220. In case the two design circuits are not equivalent, step 250 is performed.

In step 250 a counter-example is determined to negate equivalence of the two circuit designs. In some exemplary embodiments, a counter-example may represent a group of several separate executions. For example, in case the cause of the lack of equivalency of the two circuit designs is the value of input i_1, and the values of inputs i_2 and i_3 do not affect the equivalency, the counter-example may comprise the value of i_1 and not comprise the values of i_2 and i_3. Hence, the counter-example represents at least four separate executions, as i_2 and i_3 represent 2-bit of free variables.

In step 260, the gated circuit design is modified in accordance to the counter-example to determine a refined circuit design. The refined circuit design is then compared in step 220 to determine if the refined circuit design is equivalent to the original circuit design.

Referring again to step 230, in case the two circuit designs are equivalent, a determination is made in step 240 whether additional clock gating functions are available to be introduced to the circuit design. In case another clock gating function may be introduced to the circuit design, it is introduced to the circuit design in step 210. In case no additional clock gating function is available, the method ends in step 299.

For example, in an exemplary embodiment, the clock gating function introduced in step 210 refers to a first flip-flop. After that clock gating function is modified such that the refined circuit design is equivalent to the original circuit design, additional clock gating function referring to a second flip-flop may be introduced.

Figure 3:
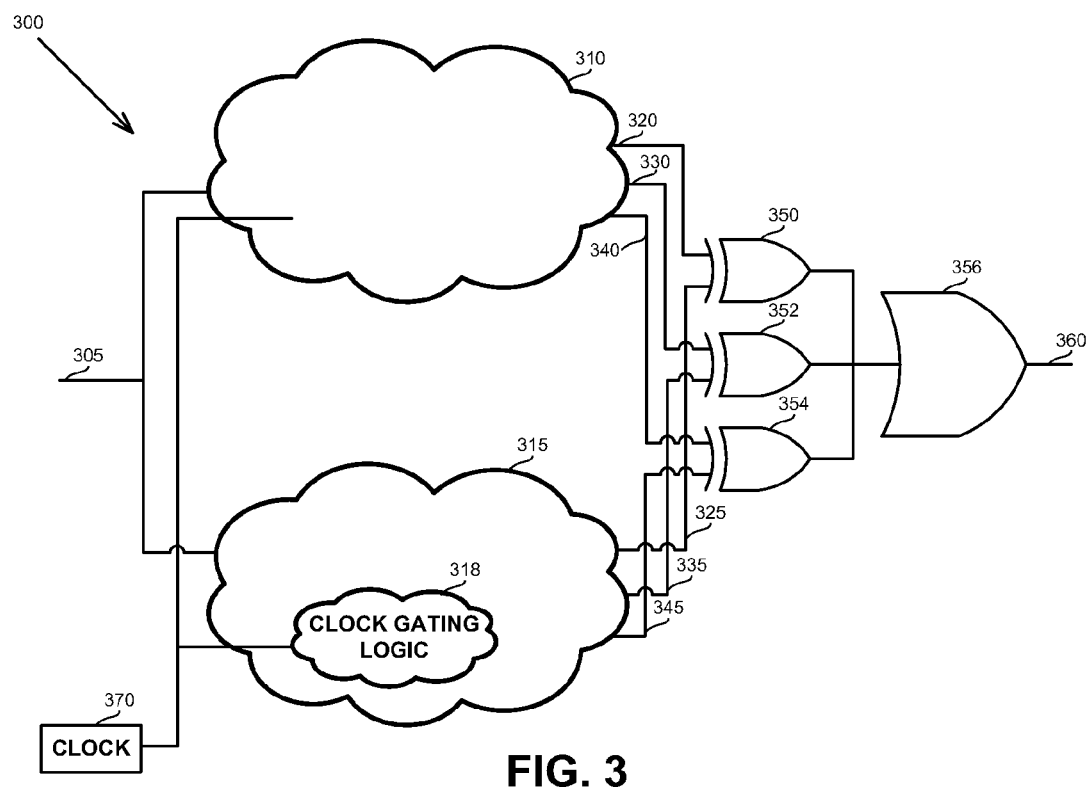
FIG. 3 shows a diagram of synthesized circuit used to compare two circuits, in accordance with some exemplary embodiments of the disclosed subject matter.

Referring now to FIG. 3 showing a diagram of synthesized circuit used to compare two circuits, in accordance with some exemplary embodiments of the disclosed subject matter. A synthesized circuit design 300 represents a comparison to be performed in order to determine equivalency of an original circuit design 310 and a gated circuit design 315. The gated circuit design 315 may be a duplication of the original circuit design 310 additionally comprising a clock gating logic 318.

In the exemplary original circuit design there is an input 305 and a clock 370. The value of the input 305 and the clock are passed to both the original circuit design 310 and the gated circuit design 315. In case combinatorial equivalency is determined, the values of all flip-flops in the original circuit design 310 are compared with the values of the corresponding flip-flops in the gated circuit design 315. In case sequential equivalency is determined the values of all outputs produced by the original circuit design 310 are compared with the values of the corresponding outputs produced by the gated circuit design 315.

In the exemplary synthesized circuit design 300, three values of the original circuit design 310 are required to be compared with their corresponding values in the gated circuit design 315. A first value 320 is XORed with the value of the corresponding first value 325 using a first XOR gate 350. A second value 330 is XORed with the value of the corresponding second value 335 using a second XOR gate 352. A third value 340 is XORed with the value of the corresponding third value 345 using a third XOR gate 354. The output values of the first, second and third XOR gates 350, 352, 354 are ORed together using an OR gate 356. The output 360 of the synthesized circuit design 300 is ONE for any execution in which the value of at least one of the first, second and third values 320, 330, 340 is different than its corresponding values (either the corresponding first, second or third value 325, 335, 345).

A model checker such as a SAT solver may be utilized to determine if there exists any execution for which the output 360 value of the synthesized circuit design 300 is ONE. The synthesized circuit design 300 is the model on which the model checker verifies a safety property of always the output 360 value is ZERO. If such an execution exists, a counter-example negating equivalency may be determined by the model checker. Otherwise, if no such execution exists, the original circuit design 310 and the gated circuit design 315 are said to be equivalent.

In some exemplary embodiments of the disclosed subject matter, modifying a circuit design in accordance to a counter-example is performed by toggling a clock gate for a specific input described by the counter-example. Toggling a clock gate may be performed by adding logic to the clock gating logic 318 such that for the specific input the clock signal is allowed to reach the flip-flop. It will be noted that the counter-example may describe a set of one or more executions. For example, a SAT solver used to determine equivalency of the two circuit designs 310, 315 may provide a partial satisfactory assignment to the synthesized circuit design 300. As each complete satisfactory assignment represents a single execution, a partial satisfactory assignment is a counter-example representing a set of executions for which the two circuit designs 310, 315 do not have corresponding values. In some exemplary embodiments, a minimal core that leads to the counter-example may be determined and used as the counter-example to increase the set of executions represented by the counter-example. In additional exemplary embodiments, a model checker such as a SAT solver may produce a set of one or more counter-examples in each iteration. The one or more counter-examples may be utilized in modifying the clock gating function. In yet other additional exemplary embodiments, the support of the output 360 of the synthesized circuit design 300 may be reduced by utilizing abstractions, reductions, approximations or preprocessing steps such as cone of influence, constant propagation, redundant logic removal and the like.

In some exemplary embodiments of the disclosed subject matter, the counter-example describes an execution of more than one cycle. A Finite State Machine (FSM) of the counter-example may be automatically produced and used to modify the gated circuit design 315. For example, the FSM may be used to determine if the input values of more than one cycle of the counter-example have been inserted to the gated circuit design 315 in order to toggle the clock gate and enable the clock signal when required. However, as an FSM may require the use of additional flip-flops, adding the entire FSM to the clock gating logic 318 may increase the power consumption of the gated circuit design 315. In some exemplary embodiments of the disclosed subject matter, a portion of the FSM is introduced to the clock gating logic 318 to provide an over-approximation of the counter-example (i.e., toggle the clock gate for every execution that corresponds to the counter-example, but also to some executions that do not correspond to the counter-example). In an exemplary embodiment, inputs of a last cycle of the counter-example are used to over-approximate the counter-example. In such a case, the inputs of the last cycle of the counter-example are considered a one or more executions in which the clock gate should be open, and the gated circuit design 315 is modified accordingly.

Figure 4:
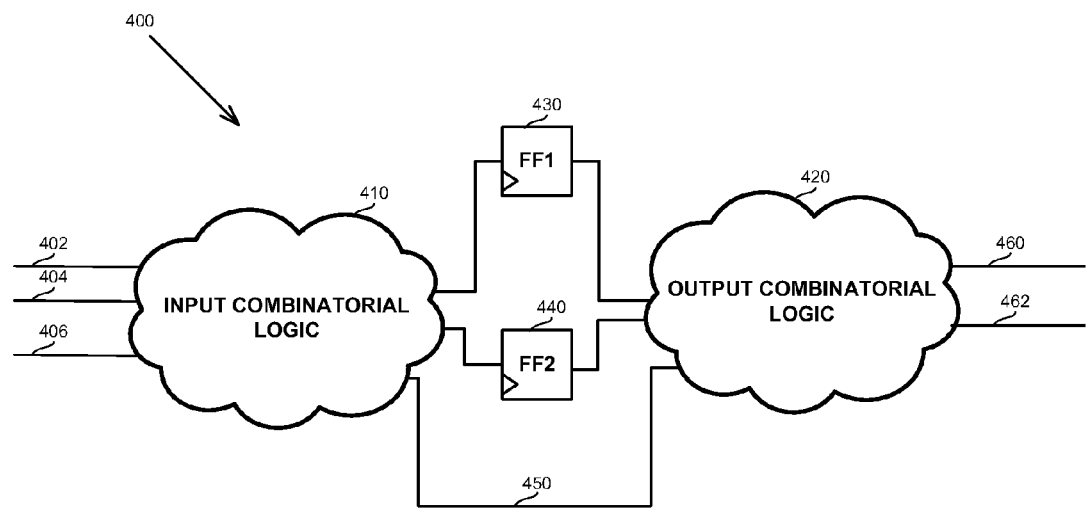
FIG. 4 shows a diagram of a basic logic cloud, in accordance with some exemplary embodiments of the disclosed subject matter.

A basic logic cloud is defined as comprising a set of one or more flip-flops, an input combinatorial logic and an output combinatorial logic, such that each output of a flip-flop may be connected through the output combinatorial logic and each input of a flip-flop may be connected through the input combinatorial logic. The set of one or more flip-flops is characterized in that no input of a flip-flop in the set depends on an output of a flip-flop in the set. FIG. 4 shows an exemplary diagram of a basic logic cloud, in accordance with some exemplary embodiments of the disclosed subject matter.

A basic logic cloud 400 comprises an input combinatorial logic 410, an output combinatorial logic 420 and a set of flip-flops comprising a first flip-flop 430 and a second flip-flop 440. Additionally, a signal 450 computed by the input combinatorial logic 410 may be directly connected to the output combinatorial logic 420. Furthermore, input signals 402, 404, 406 may be an input for the input combinatorial logic 410 of the basic logic cloud 400. Output signals 460, 462 may be an output of the output combinatorial logic 420. In some exemplary embodiments, the basic logic cloud 400 may further comprise a feedback signal (not shown) that is computed by the output combinatorial logic 420 and is connected to the input combinatorial logic 410. A clock generating clock signals that trigger the flip-flops 430, 440 is not shown.

Figure 5:
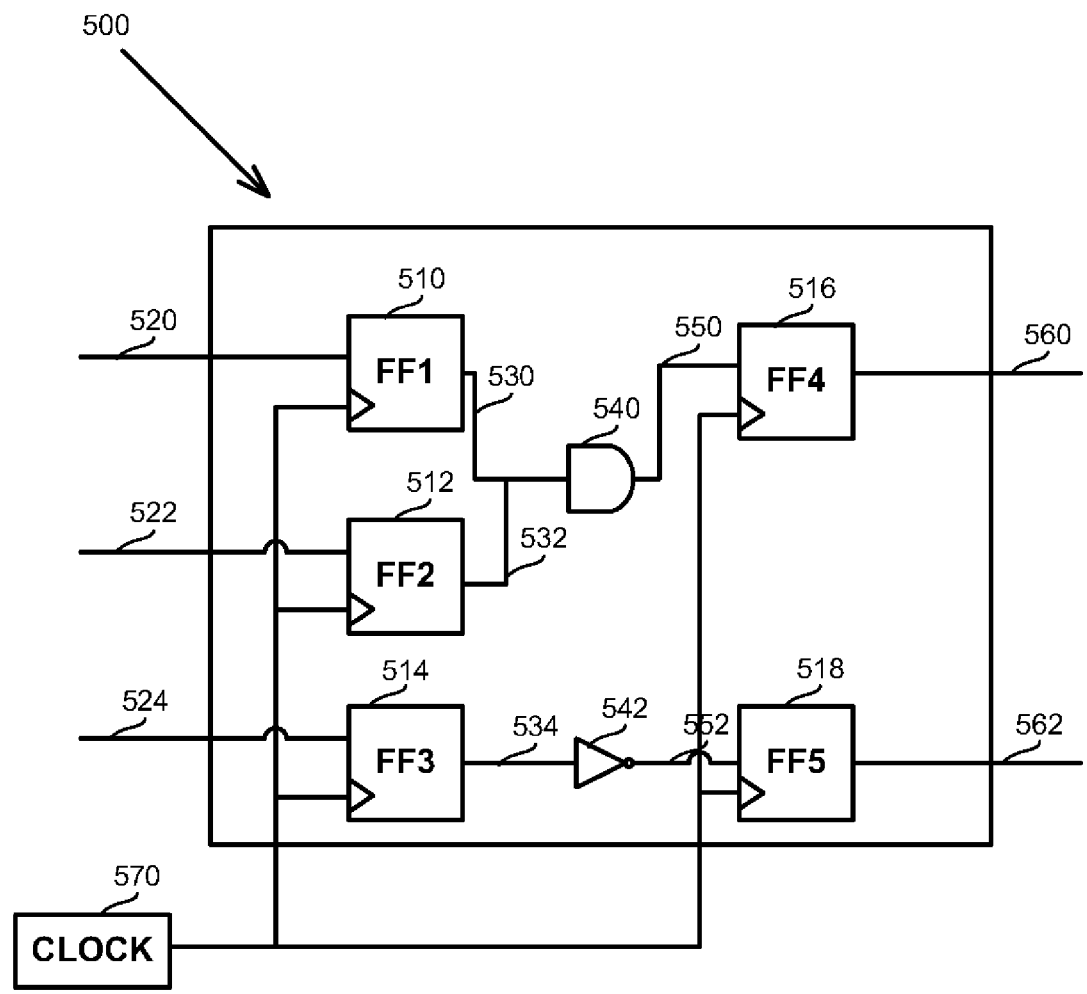
FIG. 5 shows a diagram of circuit design comprising two basic logic clouds, in accordance with some exemplary embodiments of the disclosed subject matter.

Referring now to FIG. 5 showing a diagram of circuit design comprising two basic logic clouds, in accordance with some exemplary embodiments of the disclosed subject matter. A circuit design 500 comprises input signals 520, 522, 524, output signals 560, 562 and a set of flip-flops: FF1 510, FF2 512, FF3 514, FF4 516, and FF5 518. Combinatorial logic is performed by an AND gate 540 connecting the output 530 of the FF1 510 and the output 532 of the FF2 512. The outcome 550 of the AND gate 540 is inserted to the FF4 516. Additional combinatorial logic is performed by a NOT gate 542 on the output 534 of the FF3 514 and the outcome 552 of the NOT gate 542 is inserted to the FF5 518. The output signals of the FF4 516 and the FF5 518 are connected to outputs 560, 562 of the circuit design 500. A clock 570 generates clock signals that indicate a cycle. The clock signals trigger the FF1 510, the FF2 512, the FF3 514, the FF4 516 and the FF5 518.

The circuit design 500 may be divided into two basic logic clouds: a first basic logic cloud comprises a first input combinatorial logic, a first output combinatorial logic and a first set of flip-flops. The first input combinatorial logic consists of the input signals 520, 522, 524. The first output combinatorial logic comprises the output signals 530, 532, 534, the AND gate 540, the NOT gate 542 and their outcome signals 550, 552. The first set of flip-flops comprises the FF1 510, the FF2 512 and the FF3 514. A second basic logic cloud comprises a second input combinatorial logic, a second output combinatorial logic and a second set of flip-flops. The second input combinatorial logic comprises of the output signals 530, 532, 534, the AND gate 540 and NOT gate 542 and their outcome signals 550, 552. The second output combinatorial logic comprises the output signals 560, 562. The second set of flip-flops comprises the FF4 516 and the FF5 518.

The disclosed subject matter is not limited to circuitry and may be used for other equivalent models. The models may represent hardware components, software, firmware and the like. The models may further represent business methods, activity diagrams, other UML diagrams and the like. It will be noted that throughout the present application, when referring to a circuit design, a representation of the circuit design may be used instead, such a printed circuit, a design language representation (VHDL, for example) and the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising:
    a non-transitory computer readable medium;
    a first program instruction for obtaining a first clock gating function;
    a second program instruction for modifying an original circuit design into a gated circuit design by introducing the first clock gating function to gate a state storage device;
    a third program instruction for generating a comparative circuit design in which one or more outputs of the original circuit design are compared with corresponding one or more outputs of the gated circuit design, whereby an output of the comparative circuit design is indicative of whether there is a difference in output values;
    a fourth program instructions for determining a counter-example negating equivalency between the original circuit design and the gated circuit design based on the comparative circuit design, whereby the counter-example indicating one or more executions of the gated circuit design in which different outputs are provided due to the first gating function;
    a fifth program instruction for determining a second gating function based on the first gating function and the counter-example;
    a sixth program instruction for modifying the gated circuit design to implement the second clock gating function to gate the state storage device instead of the first clock gating function, whereby a modified gated circuit design is determined;

wherein said first, second, third, fourth, fifth and sixth program instructions are stored on said non-transitory computer readable media.

2. A method comprising:
obtaining a first clock gating function;
modifying an original circuit design into a gated circuit design by introducing the first clock gating function to gate a state storage device;
generating a comparative circuit design in which one or more outputs of the original circuit design are compared with corresponding one or more outputs of the gated circuit design, whereby an output of the comparative circuit design is indicative of whether there is a difference in output values;
determining a counter-example negating equivalency between the original circuit design and the gated circuit design based on the comparative circuit design, whereby the counter-example indicating one or more executions of the gated circuit design in which different outputs are provided due to the first gating function, said determining the counter-example is performed by a processor;
determining a second gating function based on the first gating function and the counter-example; and
modifying the gated circuit design to implement the second clock gating function to gate the state storage device instead of the first clock gating function, whereby a modified gated circuit design is determined.

3. The method of claim 2 wherein said determining the second gating function comprises relaxing the first gating function with respect to the one or more executions, whereby the counter-example does not apply to the modified gated circuit design; the method further comprises storing the modified gated circuit design.

4. The method of claim 3 wherein determining the counter-example comprises model checking the comparative circuit design to determine whether the output of the comparative circuit design indicates a difference in output values.

5. The method of claim 4 wherein said modifying the original circuit design into the gated circuit design by introducing the first clock gating function comprises modifying a behavior of the state storage device.

6. The method of claim 4 wherein said determining the counter-example exemplifies a lack of combinatorial equivalence.

7. The method of claim 4 wherein said determining the counter-example exemplifies a lack of sequential equivalence.

8. The method of claim 4, wherein said generating comparative circuit, determining counter-example, determining second gating function and refining gated circuit design are performed iteratively until no additional counter-examples are available, whereby the first gating function is refined to a refined gating function that does not induce different outputs than the original circuit design.

9. The method of claim 4 wherein the original circuit design is a basic logic cloud; and the method further comprising dividing another original circuit design into one or more basic logic clouds; the one or more basic logic clouds comprise the original circuit design.

10. The method of claim 4, wherein said model checking is performed using a model checker selected from the group consisting of a SAT-based model checker, a BDD-based model checker and an STE model checker.

11. The method of claim 2, wherein the state storage device is selected from the group consisting of a flip-flop and a latch.

12. The method of claim 2,
wherein the first clock gating function is a restricting gating function that, when introduced to gate the state storage device, induces a difference in the outputs of the gated circuit design with respect to the original circuit design;
whereby the restricting gating function is iteratively relaxed until a modified clock gating function is determined;
wherein the modified clock gating function is configured to gate in a subset of the times in which the first clock gating function is configured to gate; and
wherein the modified clock gating function, when introduced to gate the state storage device, does not induce a difference in the outputs of the gated circuit design with respect to the original circuit design.

13. The method of claim 12, wherein the restricting gating function is a gating function configured to gate the state storage device on every cycle.

14. A computerized apparatus comprising a processor, wherein the processor is adapted to:
obtain a first clock gating function;
modify an original circuit design into a gated circuit design by introducing the first clock gating function to gate a state storage device;
generate a comparative circuit design in which one or more outputs of the original circuit design are compared with corresponding one or more outputs of the gated circuit design, whereby an output of the comparative circuit design is indicative of whether there is a difference in output values;
determine a counter-example negating equivalency between the original circuit design and the gated circuit design based on the comparative circuit design, whereby the counter-example indicating one or more executions of the gated circuit design in which different outputs are provided due to the first gating function;
determine a second gating function based on the first gating function and the counter-example; and
modify the gated circuit design to implement the second clock gating function to gate the state storage device instead of the first clock gating function, whereby a modified gated circuit design is determined.

15. The apparatus of claim 14 wherein said processor is adapted to determine the second gating function by relaxing the first gating function with respect to the one or more executions, whereby the counter-example does not apply to the modified gated circuit design.

16. The apparatus of claim 14 operatively coupled to a model checker, wherein said processor is adapted to determine the counter-example by utilizing the model checker to check the comparative circuit design to determine whether the output of the comparative circuit design indicates a difference in output values.

17. The apparatus of claim 14, wherein said processor is adapted to iteratively refine the first clock gating function by determining counter-examples and modifying the clock gating function accordingly, until no additional counter-example is available and the modified clock gating function does not induce different outputs than the original circuit design.

* * * * *